United States Patent
Kubota (10) Patent No.: US 9,930,200 B2
(45) Date of Patent: Mar. 27, 2018

(54) SYSTEM AND METHOD FOR EXPORTING AND IMPORTING SETTING INFORMATION

(71) Applicant: Hajime Kubota, Kanagawa (JP)

(72) Inventor: Hajime Kubota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/929,528

(22) Filed: Nov. 2, 2015

(65) Prior Publication Data
US 2016/0127574 A1 May 5, 2016

(30) Foreign Application Priority Data

Nov. 5, 2014 (JP) ................................. 2014-225639

(51) Int. Cl.
*G06F 3/12* (2006.01)
*H04N 1/00* (2006.01)

(52) U.S. Cl.
CPC ....... *H04N 1/0083* (2013.01); *H04N 1/00938* (2013.01); *H04N 1/00949* (2013.01); *H04N 1/00411* (2013.01); *H04N 1/00557* (2013.01); *H04N 1/00941* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| 2008/0201555 A1* | 8/2008 | Ooshio | H04N 1/00384 712/29 |
| 2009/0249051 A1* | 10/2009 | Tengaio | G06F 9/455 713/1 |
| 2012/0268783 A1 | 10/2012 | Nakahara | |
| 2014/0082747 A1* | 3/2014 | Negoro | G06F 21/629 726/28 |
| 2015/0002888 A1* | 1/2015 | Tsujimoto | H04N 1/00464 358/1.14 |
| 2015/0070726 A1* | 3/2015 | Umezawa | H04N 1/00416 358/1.15 |
| 2015/0098100 A1* | 4/2015 | Arai | G07C 9/00103 358/1.13 |
| 2015/0186935 A1* | 7/2015 | Hirokawa | H04N 1/00413 358/1.13 |

(Continued)

FOREIGN PATENT DOCUMENTS

JP 2012-226662 11/2012
JP 2012-249183 12/2012

*Primary Examiner* — Miya J Williams
(74) *Attorney, Agent, or Firm* — Oblon, McClelland, Maier & Neustadt, L.L.P.

(57) ABSTRACT

An information processing system includes: an operation unit that receives an operational input; and an main body unit that operates depending on the operational input, wherein, the operation unit includes a first setting manager that transmits, to the main body unit, first setting information in which setting information of at least one operation unit application which is an application working in the operation unit is integrated and the main body unit includes a second setting manager that outputs second setting information in which setting information of at least one main body unit application which is an application working in the main body unit and the first setting information is integrated.

4 Claims, 9 Drawing Sheets

(56) References Cited

U.S. PATENT DOCUMENTS

2015/0249769 A1* 9/2015 Asahara ............ H04N 1/00962
 358/1.13
2017/0126919 A1* 5/2017 Kubota ............ H04N 1/00411

* cited by examiner

| APPLI-CATION ID | ITEM ID | ITEM NAME | CONFI-DENTIAL INFOR-MATION OR NOT | UNIQUE INFOR-MATION OR NOT | SETTING VALUE |
|---|---|---|---|---|---|
| 3 | 10000001 | VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| ... | ... | ... | ... | ... | ... |

FIG.7

| APPLI-CATION ID | ITEM ID | ITEM NAME | CONFI-DENTIAL INFOR-MATION OR NOT | UNIQUE INFOR-MATION OR NOT | SETTING VALUE |
|---|---|---|---|---|---|
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

FIG.8

| APPLI-CATION ID | ITEM ID | ITEM NAME | CONFI-DENTIAL INFOR-MATION OR NOT | UNIQUE INFOR-MATION OR NOT | SETTING VALUE |
|---|---|---|---|---|---|
| 3 | 10000001 | VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

FIG.9

| APPLI-CATION ID | ITEM ID | ITEM NAME | CONFI-DENTIAL INFOR-MATION OR NOT | UNIQUE INFOR-MATION OR NOT | SETTING VALUE |
|---|---|---|---|---|---|
| 1 | 50000001 | DEFAULT PAPER FEED TRAY | FALSE | FALSE | TRAY 1 |
| 1 | 50000002 | DEFAULT PAPER EJECTION TRAY | FALSE | FALSE | MAIN BODY PAPER EJECTION |
| ... | ... | ... | ... | ... | ... |
| 3 | 10000001 | VOLUME | FALSE | FALSE | 4 |
| 3 | 10000002 | WiFi | FALSE | FALSE | ON |
| 3 | 10000003 | WiFi DEVICE NAME | FALSE | TRUE | device1 |
| 3 | 10000004 | ADMINISTRATOR PASSWORD | TRUE | FALSE | gaosuXsgsu |
| 3 | 11000001 | WALLPAPER | FALSE | FALSE | (BINARY DATA) |
| 3 | 11000002 | SCREEN 1 ARRANGEMENT | FALSE | FALSE | (BINARY DATA) |
| 3 | 11000003 | SCREEN 2 ARRANGEMENT | FALSE | FALSE | (BINARY DATA) |
| ... | ... | ... | ... | ... | ... |

FIG.11

SYSTEM AND METHOD FOR EXPORTING AND IMPORTING SETTING INFORMATION

CROSS-REFERENCE TO RELATED APPLICATIONS

The present application claims priority to and incorporates by reference the entire contents of Japanese Patent Application No. 2014-225639 filed in Japan on Nov. 5, 2014.

BACKGROUND OF THE INVENTION

1. Field of the Invention

The present invention relates to a system and a method for information processing.

2. Description of the Related Art

There is an image forming device provided with, in addition to a main body unit that provides conventional functions of an image forming device, an operation unit that provides various functions using the conventional functions. The operation unit is provided with an OS (Operating System) and an application that works on this OS and realizes various functions.

Besides, there is another image forming device including a function of outputting (exporting) setting information (setting value) for each of various functions and a function of inputting setting information and performing a setting (import) with respect to various functions. These functions are used in a situation where the same setting is applied to a plurality of devices collectively and the same setting of a device before device replacement is applied to a replaced device.

There is a need for a system and a method for information processing capable of effectively managing setting information even with a configuration provided with a main body unit and an operation unit.

SUMMARY OF THE INVENTION

According to example embodiments of the present invention, there is provided an information processing system, comprising: an operation unit that receives an operational input; and an main body unit that operates depending on the operational input, wherein, the operation unit includes a first setting manager that transmits, to the main body unit, first setting information in which setting information of at least one operation unit application which is an application working in the operation unit is integrated, and the main body unit includes a second setting manager that outputs second setting information in which setting information of at least one main body unit application which is an application working in the main body unit and the first setting information is integrated.

Example embodiments of the present invention also provides an information processing method to be executed in an information processing system including an operation unit that receives an operational input and a main body unit that operates depending on the operational input, the information processing method comprising: transmitting, to the main body unit, first setting information in which setting information of at least one operation unit application which is an application working in the operation unit is integrated; and exporting second setting information in which setting information of at least one main body unit application which is an application working in the main body unit and the first setting information is integrated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of a system and a method for information processing according to the present invention will be explained in detail below with reference to the accompanying drawings.

In an explanation below, an example of realizing an information processing system as an MFP (Multifunction Peripheral) provided with at least two functions among a copying function, a printing function, a scanner function, and a facsimile function will be explained. Except for the multifunction peripheral, the system may be applied to an image forming device such as a copying machine, a printer, a scanner, and a facsimile device. Besides, an applicable system (device) is not limited to the image forming device and any device is applicable as long as the system (device) is provided with a main body unit and an operation unit.

An MFP according to the embodiment is provided with an operation unit that receives an operational input and a main body unit that operates depending on the operational input. A setting manager (first setting manager) provided in the operation unit acts as one of target modules of a setting management processing (export, import, and the like of setting information) performed by a setting manager (second setting manager) of the main body unit. The setting manager provided in the operation unit manages setting information of an application within the operation unit in accordance with a notification by the setting manager of the main body unit. It thus becomes possible to effectively manage setting information of each of applications divided for the operation unit and the main body unit.

Figure 1:
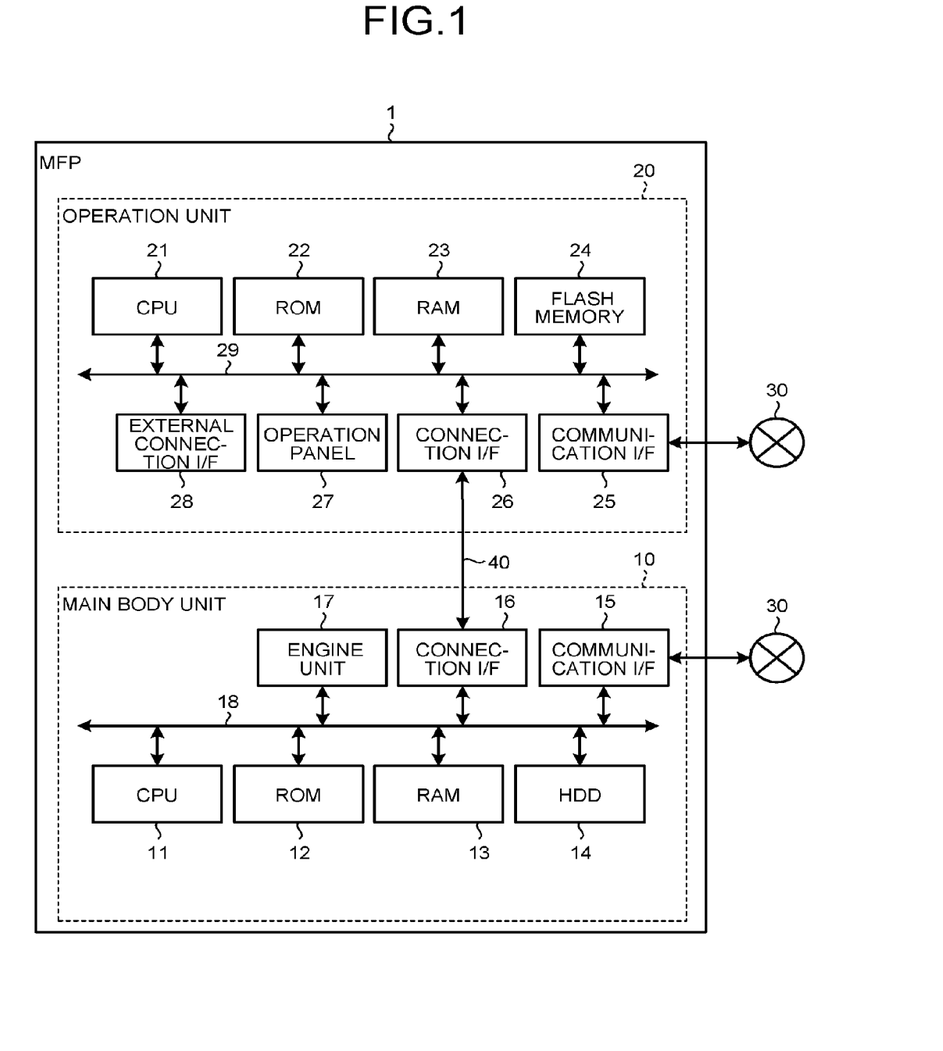
FIG. 1 is a diagram illustrating an example of a hardware configuration of an MFP according to an embodiment of the present invention.

An example of a hardware configuration of an MFP 1 will be explained. FIG. 1 illustrates an example of a hardware configuration of an MFP 1 according to the embodiment. As illustrated in FIG. 1, the MFP 1 is provided with a main body unit 10 and an operation unit 20. The main body unit 10 realizes functions of various kinds including a copying function, a scanner function, a facsimile function, a printing function, and the like. The operation unit 20 receives information (operational input) appropriate to an operation by a user. The concept of receiving an operation by a user includes receiving information (including a signal indicating coordinate values on a screen and the like) input depending on the operation by the user.

The main body unit 10 and the operation unit 20 are connected via a connection I/F 16, a dedicated communication channel 40, and a connection I/F 26 in such a manner that a communication therebetween is enabled. While a USB (Universal Serial Bus) standard may be used for the communication channel 40, for example, any arbitrary standard may be used, irrespective of being wired or wireless.

The main body unit 10 performs an operation depending on the operation received by the operation unit 20. The main body unit 10 is also capable of communicating with an external device such as a client PC (personal computer) and performing an operation depending on an instruction (a print instruction and the like) received from the external device.

A hardware configuration of the main body unit 10 will be explained first. As illustrated in FIG. 1, the main body unit 10 is provided with a CPU 11, a ROM 12, a RAM 13, an HDD (Hard Disk Drive) (first storage) 14, a communication I/F (interface) 15, the connection I/F 16, and an engine unit 17. The CPU 11, the ROM 12, the RAM 13, the HDD 14, the communication I/F 15, the connection I/F 16, and the engine unit 17 are connected to each other via a system bus 18.

The CPU 11 totally controls an operation of the main body unit 10. The CPU 11 uses the RAM 13 as a work area (work space) and executes programs stored in the ROM 12 or the HDD 14 to control the entire operation of the main body unit 10 and realize various functions including the copying function, the scanner function, the facsimile function, and the printing function.

The communication I/F 15 is an interface that enables a connection to a network 30. The connection I/F 16 is an interface that enables a communication with the operation unit 20 via the communication channel 40.

The engine unit 17 is a hardware that performs a processing, except for a versatile information processing and communication, for realizing the copying function, the scanner function, the facsimile function, and the printing function. For example, the engine unit 17 is provided with a scanner (image scanning unit) that scans and reads out an image of a document, a plotter (image forming unit) that performs printing onto a sheet member such as paper, a facsimile unit that performs a facsimile communication, and the like. The engine unit 17 may further be provided with hardware that realizes special options such as a finisher that sorts printed sheet members and an ADF (Automatic Document Feeder) that automatically feeds a document.

Next, a hardware configuration of the operation unit 20 will be explained. As illustrated in FIG. 1, the operation unit 20 is provided with a CPU 21, a ROM 22, a RAM 23, a flash memory (second storage) 24, a communication I/F 25, the connection I/F 26, an operation panel 27, and an external connection I/F 28. The CPU 21, the ROM 22, the RAM 23, the flash memory 24, the communication I/F 25, the connection I/F 26, the operation panel 27, and the external connection I/F 28 are connected to each other via a system bus 29.

The CPU 21 totally controls an operation of the operation unit 20. The CPU 21 uses the RAM 23 as a work area (work space) and executes programs stored in the ROM 22 or the flash memory 24 to control the entire operation of the operation unit 20 and realize various functions including a display and the like of information (image) in accordance with an input received from a user.

The communication I/F 25 is an interface that enables a connection to the network 30. The connection I/F 26 is an interface that enables a communication with the main body unit 10 via the communication channel 40.

The operation panel 27 receives inputs of various kinds in accordance with operations by a user and displays information of various kinds (for example, information appropriate to the received operation, information indicating an operational status of the MFP 1, and information indicating a setting condition). While the operation panel 27 is a liquid crystal display (LCD) device equipped with a touch-screen function in this example, the invention is not limited thereto. The operation panel 27 may be configured by an organic EL display device equipped with a touch-screen function, for example. Moreover, the operation panel 27 may further be provided with an operation unit such as a hardware key and a display unit such as a lamp in addition to or in place of the configuration.

The external connection I/F 28 is an interface that enables a connection to an IC card reader and the like, for example.

Figure 2:
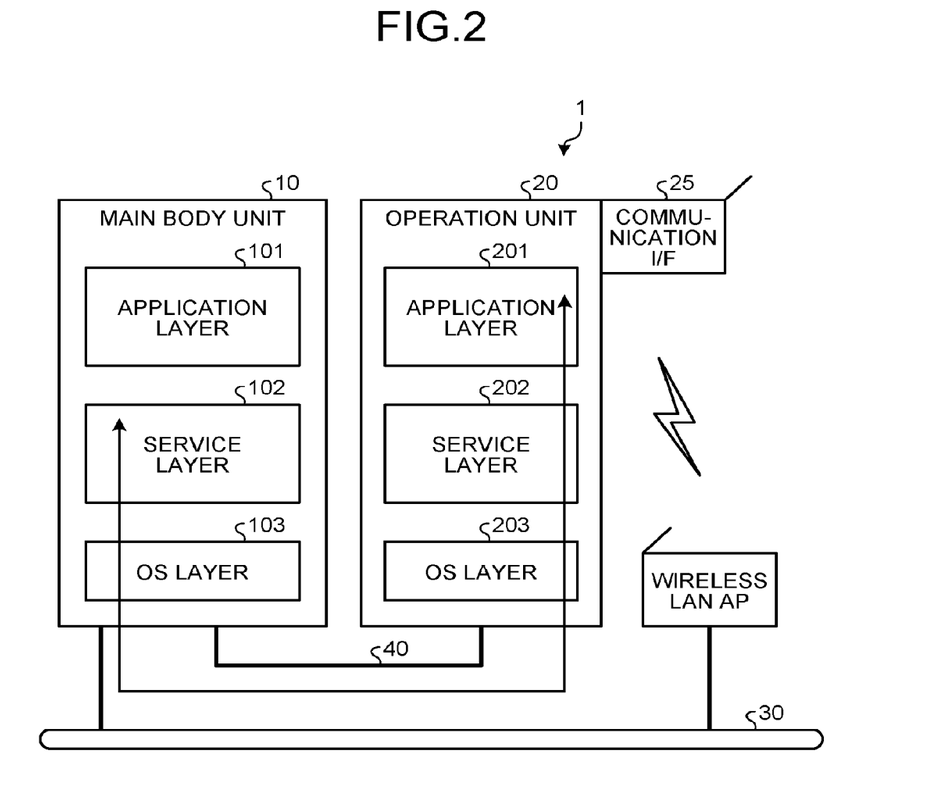
FIG. 2 is a diagram illustrating an example of a software configuration of the MFP according to the embodiment.

Next, a software configuration of the MFP 1 will be explained. FIG. 2 illustrates an example of a software configuration of the MFP 1 according to the embodiment. As illustrated in FIG. 2, the main body unit 10 is provided with an application layer 101, a service layer 102, and an OS layer 103. The substances of the application layer 101, the service layer 102, and the OS layer 103 are software of various kinds stored in the ROM 12, the HDD 14, and the like (see FIG. 1). The CPU 11 executes the software, so that functions of various kinds are provided.

A software of the application layer 101 is an application software (hereinafter sometimes referred to simply as "application" in the explanation below) for providing a predetermined function by operating a hardware resource. For such applications, a copy application that provides a copying function, a scanner application that provides a scanner function, a facsimile application that provides a facsimile function, and a printer application that provides a printing function can be listed, for example.

A software of the service layer 102 intervenes between the application layer 101 and the OS layer 103 and provides, with respect to an application, an interface that enables using a hardware resource provided in the main body unit 10. More specifically, the software of the service layer 102 provides a function of receiving an operation request to the hardware resource and performing an arbitration of operation requests. Possible operation request received by the service layer 102 include a request for scanning by a scanner and a request for printing by a plotter.

The interface function of the service layer 102 is provided not only to the application layer 101 of the main body unit 10 but also to an application layer 201 of the operation unit 20. Specifically, the application layer 201 (application) of the operation unit 20 is also capable of realizing functions using the hardware resource (the engine unit 17 in FIG. 1, for example) of the main body unit 10 via the interface function of the service layer 102.

A software of the OS layer 103 is a basic software (operating system) for providing a basic function of controlling the hardware provided in the main body unit 10. The software of the service layer 102 converts a request for using the hardware resource from various applications into a command which can be interpreted by the OS layer 103 and passes the command to the OS layer 103. The software of the OS layer 103 executes the command, so that the hardware resource operates in accordance with the request from the applications.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body unit 10. However, the functions provided by the applications of the application layer 201 and the kinds of the operation requests which can be received by the service layer 202 are different from those of the main body unit 10. While an application of the application layer 201 may be a software that causes the hardware resource provided in the operation unit 20 to operate to provide a predetermined function, the application of the application layer 201 is a software that chiefly provides a function as a UI (User Interface) that allows an operation and a display with regard to functions (the copying function, the scanner function, the facsimile function, and the printing function) provided in the main body unit 10.

In addition, in the present embodiment, too maintain independence in function, the software of the OS layer 103 of the main body unit 10 is different from the software of the OS layer 203 of the operation unit 20. In other words, the main body unit 10 and the operation unit 20 independently operate with each other by separated operating systems. For example, the Linux (Registered Trademark) may be used for the software of the OS layer 103 of the main body unit 10 and the Android (Registered Trademark) may be used for the software of the OS layer 203 of the operation unit 20.

Since the main body unit 10 and the operation unit 20 operate by separated operating systems in the MFP 1, the communication between the main body unit 10 and the operation unit 20 is performed not as an inter-process communication within a common device but as a communication between different devices. The communication between different devices, for example, includes a transmission operation (command communication) of information received by the operation unit 20 (a content instructed by a user) to the main body unit 10 and an operation, by the main body unit 10, of notifying the operation unit 20 of an event. Here, the operation unit 20 is capable of using the function of the main body unit 10 by performing the command communication with the main body unit 10. The event to be notified by the main body unit 10 to the operation unit 20 includes an execution status of the operation in the main body unit 10, information which is set in the main body unit 10, and the like.

While the power is supplied from the main body unit 10 to the operation unit 20 via the communication channel 40 in the embodiment, it is possible to control the power source of the operation unit 20 separately (independently) from the control of the power source of the main body unit 10.

While the main body unit 10 and the operation unit 20 operate by separated operating systems in the embodiment, the present invention is not limited thereto and the main body unit 10 and the operation unit 20 may be configured to operate by the same operating system. Besides, the main body unit 10 and the operation unit 20 may be integrally configured. For example, the hardware configurations of the main body unit 10 and the operation unit 20 may not necessarily be separated as illustrated in FIG. 1, and the functions of the main body unit 10 and the operation unit 20 may be realized on one hardware configuration.

Figure 3:
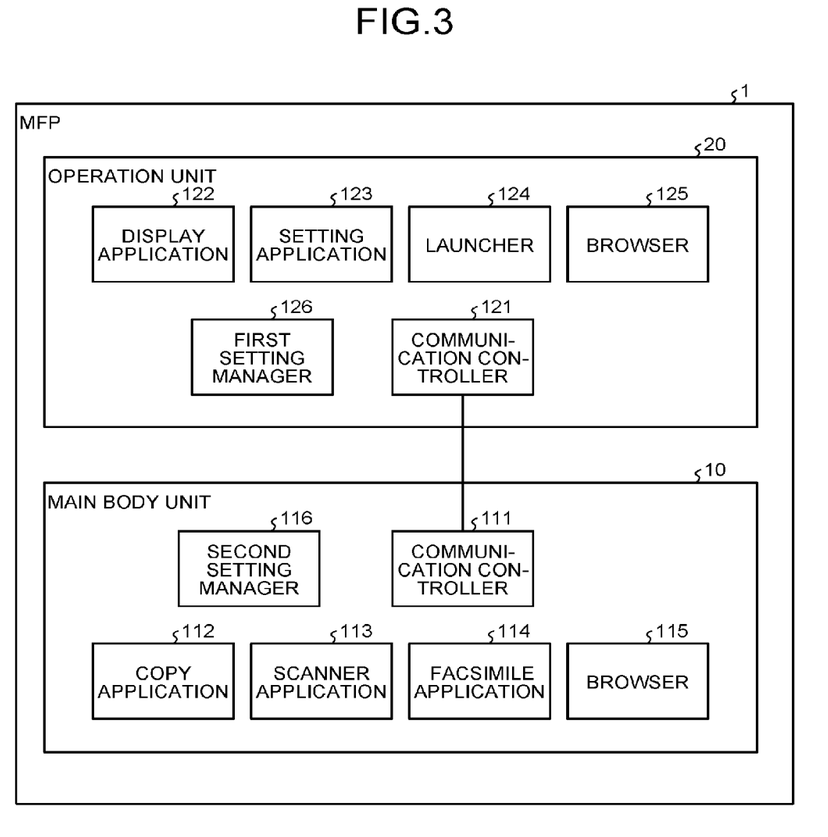
FIG. 3 is a diagram illustrating an example of functional blocks of the MFP according to the embodiment.

Next, an example of functional blocks of the MFP 1 realized by the hardware in FIG. 1 and the software in FIG. 2 will be explained. FIG. 3 illustrates an example of functional blocks of the MFP 1 according to the embodiment. As illustrated in FIG. 3, the MFP 1 is provided with the main body unit 10 and the operation unit 20.

The main body unit 10 will be explained first. The main body unit 10 is provided with a communication controller 111, a copy application 112, a scanner application 113, a facsimile application 114, a browser 115, and a setting manager 116 (second setting manager).

The communication controller 111 controls a communication with the operation unit 20. The communication controller 111 transmits and receives information of various kinds to and from a communication controller 121 of the operation unit 20 via the connection I/F 16 and the connection I/F 26, for example. The communication controller 111 may further be provided with a function of controlling a communication with the network 30 via the communication I/F 15, for example.

The copy application 112, the scanner application 113, and the facsimile application 114 respectively provide the copying function, the scanner function, and the facsimile function. The browser 115 provides a browser function including a display of a web page.

The copy application 112, the scanner application 113, the facsimile application 114, and the browser 115 are examples of applications working in the main body unit 10 (main body unit applications). In the explanation below, an application working in the main body unit 10 is sometimes referred to as "main body unit application" and an application working in the operation unit 20 is sometimes referred to as "operation unit application".

In the main body unit 10, an application other than the copy application 112, the scanner application 113, the facsimile application 114, and the browser 115 may work, or a part of those applications may work. It is not necessary that those applications correspond to the application layer 101. In other words, the main body unit application is not limited to applications corresponding to the application layer 101. For example, any processor (software and the like) which operates in the main body unit 10 and is capable of importing and exporting setting information can serve as the main body unit application. For example, a processor (software and the like) that corresponds to the service layer 102 and the OS layer 103 may be the main body unit application.

The second setting manager 116 imports and exports setting information. The second setting manager 116 generates setting information (second setting information) in which setting information of respective main body unit applications and setting information (first setting information) received from a setting manager (first setting manager) 126 of the operation unit 20 are integrated, for example. The second setting manager 116 outputs (exports) the generated second setting information. For the method of integrating setting information, any method capable of reflecting the setting information with respect to each of the applications when imported may be adopted. For example, a method of connecting respective pieces of setting information to generate one set of information (export file and the like) can be applied.

When a request for importing setting information is made by a user and the like, the second setting manager 116 performs importing depending on the request. The second setting manager 116 receives setting information to import (third setting information), for example. The setting information to import is, for example, setting information which is exported from its own device (MFP 1) or another MFP. The setting information to import includes at least one of setting information of the main body unit application and setting information of the operation unit application.

The second setting manager 116 stores, in the HDD 14 (an example of a first storage), each piece of setting information which is included in the setting information to import and corresponds to each application. The second setting manager 116 requests each of the main body unit applications and the first setting manager 126 of the operation unit 20 to import the setting information stored in the HDD 14.

Next, the operation unit 20 will be explained. The operation unit 20 is provided with the communication controller 121, a display application 122, a setting application 123, a launcher 124, a browser 125, and the first setting manger 126.

The communication controller 121 controls a communication with the main body unit 10. The communication controller 121 transmits and receives information of various kinds to and from the communication controller 111 of the main body unit 10 via the connection I/F 16 and the connection I/F 26, for example. The communication controller 121 may further be provided with a function of controlling a communication with the network 30 via the communication I/F 25, for example.

The display application 122 enables a display of information of various kinds in a display device (the operation panel 27, for example) of the operation unit 20. The display application 122 controls the display of the information in the operation panel 27 depending on a request from an image display library embedded in each of modules (the main body unit applications, the second setting manager 116, and the like) in the main body unit 10, for example.

The setting application 123 enables a various kinds of settings of the operation unit 20. The setting application 123 performs a volume setting when the operation unit 20 is provided with a speaker, a communication system setting, a password setting in authentication, and the like, for example.

The launcher 124 enables a control of an activation of other applications working in the operation unit 20. The browser 125 enables providing a browser function including a display of a web page.

The display application 122, the setting application 123, launcher 124, and the browser 125 are examples of operation unit application. An application other than the operation unit applications such as the display application 122, the setting application 123, the launcher 124, and the browser 125 may work in the operation unit 20 or a part of those operation unit applications may work. It is not necessary that the operation unit applications correspond to the application layer 201. In other words, the operation unit applications are not limited to applications corresponding to the application layer 201. For example, any processor (software and the like) capable of importing and exporting setting information can serve as the operation unit application. For example, a processor (software and the like) corresponding to the service layer 202 and the OS layer 203 may be the operation unit application.

The operation unit 20 may be configured such that an application generated by a third vendor (third vendor application) works. In this case, an external application service that provides a necessary service to a third vendor application may be provided as a service corresponding to the service layer 202. The external application service is provided to hide an interface which enables a third vendor to generate an application without a knowledge about an advanced operation and a minute specification of the main body unit 10 and an interface which cannot be published.

The first setting manager 126 imports and exports setting information. For example, the first setting manager 126 generates setting information (first setting information) in which respective pieces of setting information of respective operation unit applications are integrated. The first setting manager 126 transmits the generated first setting information to the second setting manager 116 of the main body unit 10. For the method of integrating the setting information, any method capable of reflecting the setting information to each of the applications when imported may be adopted. For example, a method of connecting respective pieces of setting information to generate one set of information (export file and the like) can be applied.

When a request to import the setting information from the second setting manager 116 of the main body unit 10 is made, the first setting manager 126 performs importing depending on the request. The first setting manager 126 requests each of the operation unit applications, for example, when requested to import the setting information from the second setting manager 116, to import the setting information stored in the HDD 14.

Figure 4:
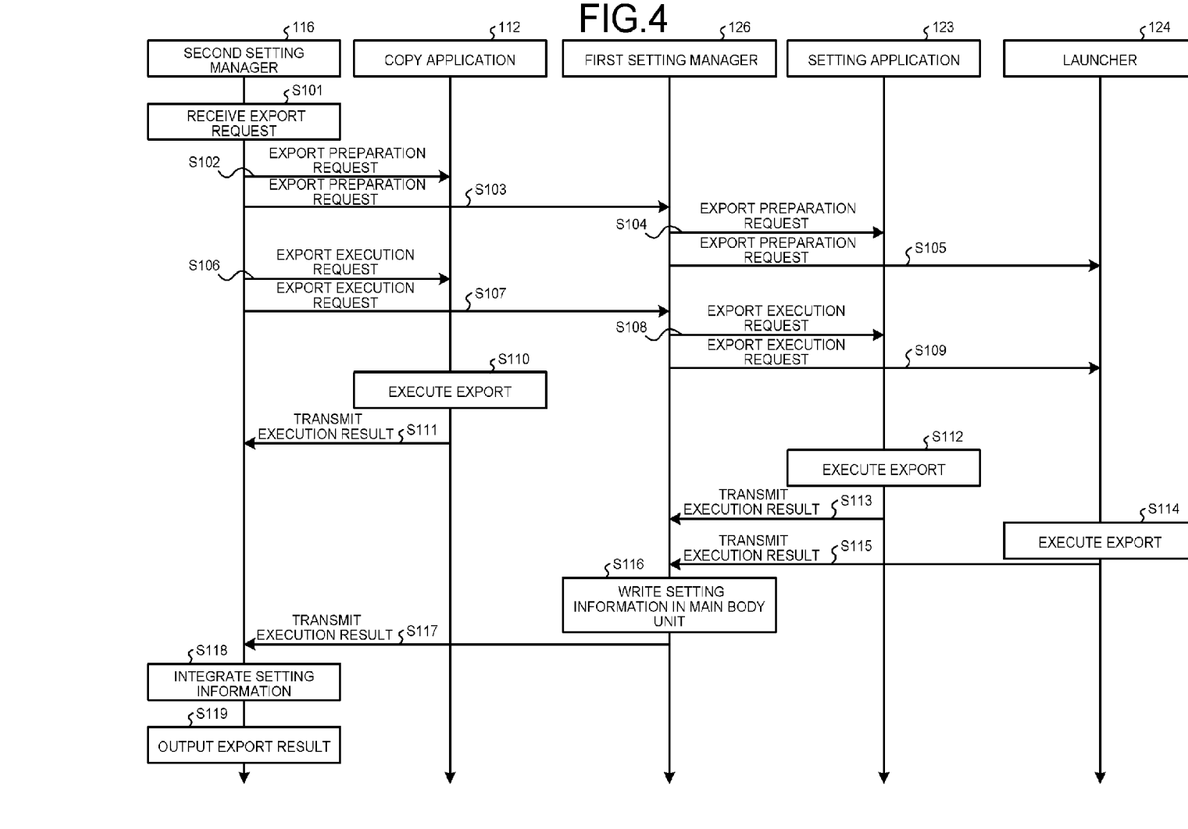
FIG. 4 is a sequence diagram of an example of an export processing according to the embodiment.

Next, an export processing by the MFP 1 configured in this manner according to the embodiment will be explained with reference to FIG. 4. FIG. 4 is a sequence diagram of an example of an export processing according to the embodiment.

In the embodiment, the second setting manager 116 of the main body unit 10 receives a request for exporting the setting information from an outside (user and the like) and starts the export processing. A result of the processing is output to the user and the like being an origin of the request.

The second setting manager 116 first receives the export request from a user and the like (step S101). For example, a user inputs the export request by using a predetermined application and the like of the operation unit 20. The export request is transmitted to the second setting manager 116 via the communication controller 121 and the communication controller 111, for example. The export request may include a designation of an application as an export target, a designation of a destination of an output of the setting information (export file and the like) to export eventually, and the like.

The second setting manager 116 transmits an export preparation request (steps S102 and S103). The first setting manager 126 of the operation unit 20 transmits the export preparation request to the inside of the operation unit 20 when receiving the export preparation request from the second setting manager 116 (steps S104 and S105).

The export preparation request causes each application to execute a processing which becomes necessary before the export of the setting information. When such a processing is not necessary, the export preparation request may be configured not to be transmitted.

The second setting manager 116 of the main body unit 10 transmits the export preparation request to the application designated as the export target, for example. Any method may be adopted to determine the application as the export target. The second setting manager 116 treats, for example, the application designated with the export request as the export target. The second setting manager 116 may treat a preset application as the export target.

The second setting manager 116 may transmit the export preparation request without designating an address (application) by broadcast and the like. In this case, the application having received the export preparation request executes a processing appropriate to the request when oneself is the application as the export target.

Similarly, the first setting manager 126 of the operation unit 20 transmits the export preparation request by broadcast and the like, or to a designated operation unit application. When the OS of the operation unit 20 is the Android (Registered Trademark), "sendOrderedBroadcast" and the like can be used for transmission by broadcast. The operation unit application having received the export preparation request executes a processing appropriate to the request when oneself is the export target. Here, it is possible to configure to determine whether or not oneself is the export target based on the information that is set in advance in the storage such as the flash memory 24.

FIG. 4 illustrates an example in which the copy application 112 working in the main body unit 10, and the setting application 123 and the launcher 124 working in the operation unit 20 are treated each as the export target.

The second setting manager 116 of the main body unit 10 transmits an export execution request (steps S106 and S107). The first setting manager 126 of the operation unit 20 transmits the export execution request to the inside of the operation unit 20 when receiving the export execution request from the second setting manager 116 (steps S108 and S109). The export execution request may be transmitted to the application as the export target or by broadcast and the like similarly to the export preparation request.

Each application as the export target having received the export execution request executes an export for writing its own setting information in a designated or a preset storage (second storage) (steps S110, S112, and S114). The copy application 112 in the main body unit 10 writes its own setting information in the HDD 14, for example. Besides, the setting application 123 and the launcher 124 in the operation unit 20 write their own setting information in the flash memory 24, for example.

Each application transmits a result of the execution of the export to the origin of the transmission of the export execution request. For example, the copy application 112 transmits the execution result to the second setting manager 116 (step S111). For example, the setting application 123 and the launcher 124 transmit the execution result to the first setting manager 126 (steps S113 and S115). The execution result may include information that specifies the application having executed the export (application ID and the like) and information that specifies the exported setting information (storage place of the export file, a name, and the like).

When receiving the execution result from each of the applications (the setting application 123 and the launcher 124 in the example of FIG. 4) in the operation unit 20, the first setting manager 126 of the operation unit 20 reads out the setting information stored for each of the applications and generates setting information (first setting information) in which the read setting information is integrated. The first setting manager 126 writes the generated setting information in the storage (the HDD 14, for example) of the main body unit 10 (step S116). The first setting manager 126 transmits a result of the execution of the writing processing to the second setting manager 116 of the main body unit 10 (step S117).

When receiving the execution result from all the applications each as the export target, the second setting manager 116 reads out the setting information stored for each of the applications and generates setting information (second setting information) in which the read setting information is integrated (step S118). The second setting manager 116 outputs the generated setting information (step S119). The second setting manager 116 writes the generated setting information in the HDD 14 and notifies the result of the writing to the origin of the export request.

As explained so far, the first setting manager 126 of the operation unit 20 executes the export processing which is dedicated to the operation unit 20 and intended for the applications within the operation unit 20. The second setting manager 116 of the main body unit 10 executes the export processing by treating the first setting manager 126 of the operation unit 20 as an application as the export target. It thus becomes possible to effectively and dispersedly execute the export processing of the setting information of each of the applications which are separated to the operation unit 20 and the main body unit 10.

Figure 5:
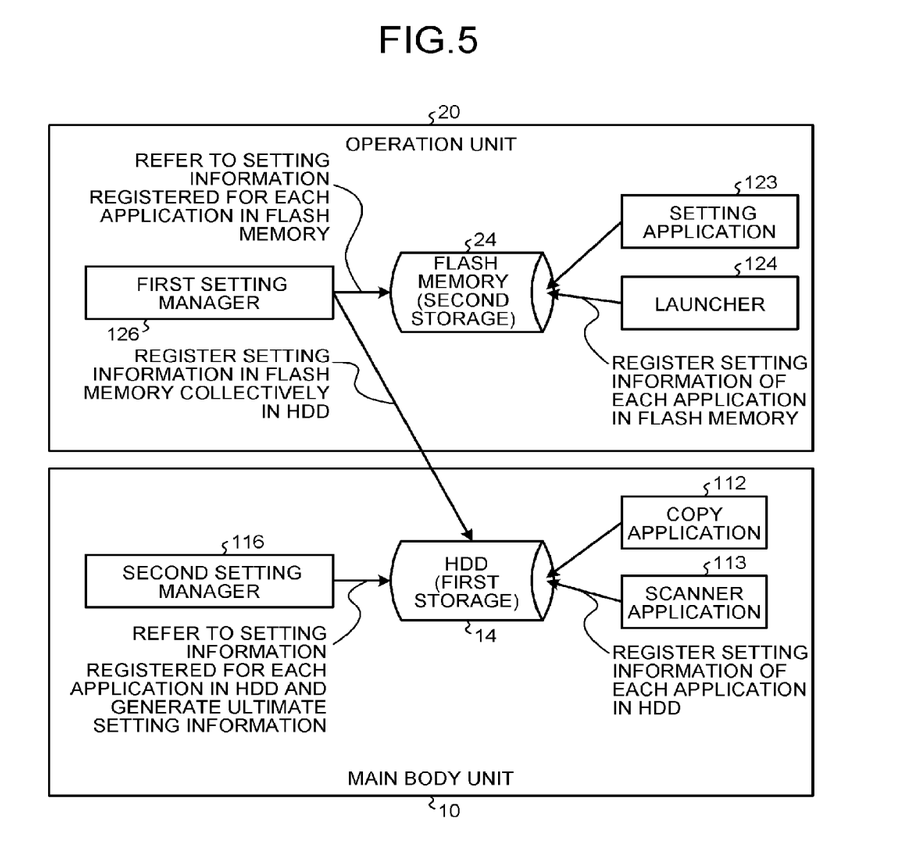
FIG. 5 is an explanatory view of a flow of each piece of information in the export processing.

FIG. 5 is an explanatory view of a flow of each piece of information in the export processing. FIG. 5 illustrates an example in which the copy application 112, the scanner application 113, the setting application 123, and the launcher 124 are treated each as the export target.

In the export processing, each of the applications as the export target stores its own setting information in the storage (the HDD 14 or the flash memory 24). For example, the copy application 112 and the scanner application 113 store the setting information in the HDD 14. The setting application 123 and the launcher 124 store the setting information in the flash memory 24.

The first setting manager 126 of the operation unit 20 collects setting information stored for the applications (the setting application 123 and the launcher 124 in the example in FIG. 5) in the operation unit 20 and stores the collected setting information as a total export result of the operation unit 20 in the HDD 14 of the main body unit 10.

The second setting manager 116 of the main body unit 10 further connects the setting information that each of the applications (including the first setting manager 126) stores in the HDD 14 together to output it to the outside (by editing it when necessary) and stores the information in the HDD 14.

Next, an example of a data structure of setting information will be explained with reference to FIGS. 6 to 9.

Figure 6:
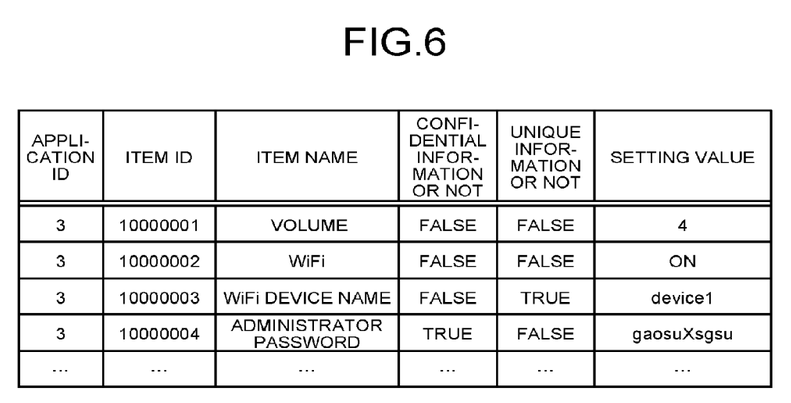
FIG. 6 is a diagram illustrating an example of setting information to be processed by an operation unit application.
Figure 7:
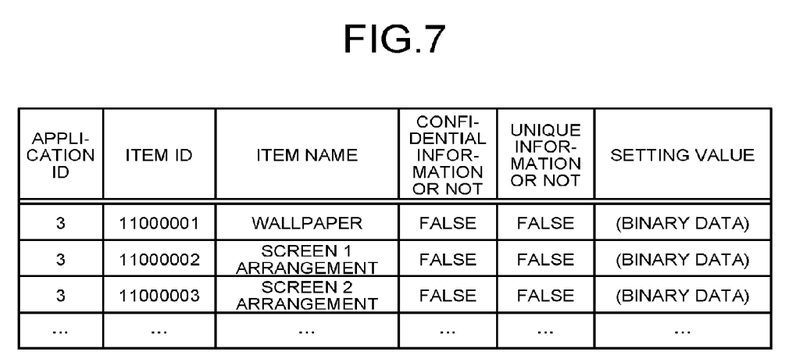
FIG. 7 is a diagram illustrating an example of setting information to be processed by an operation unit application.

FIGS. 6 and 7 illustrate an example of setting information to be processed operation unit applications. FIG. 6 illustrates an example of setting information of the setting application 123. FIG. 7 illustrates an example of setting information of the launcher 124. As illustrated in FIGS. 6 and 7, setting information includes an application ID, an item ID, an item name, confidential information, unique information, and a setting value.

The application ID is identifying information that identifies an application. For example, respective application IDs are allotted to the applications each as the export target in the main body unit 10 and the first setting manager 126 of the operation unit 20 treated as one application. The item ID is identifying information that identifies each of setting items included in setting information. The item name is a name of a setting item.

The confidential information indicates whether or not information of the setting item should be kept confidential. For example, "TRUE" is set when information of the setting item should be kept confidential and "FALSE" is set when information of the setting item should not be kept confidential. When the confidential information is "TRUE", the second setting manager 116 may encrypt the setting information (setting value) and export the encrypted setting information.

The unique information indicates whether or not information of the setting item is inherent to the device. For example, "TRUE" is set when information of the setting item is inherent to the device and "FALSE" is set when information of the setting item is not inherent to the device.

The setting value indicates a value which is set to the setting item.

Figure 8:
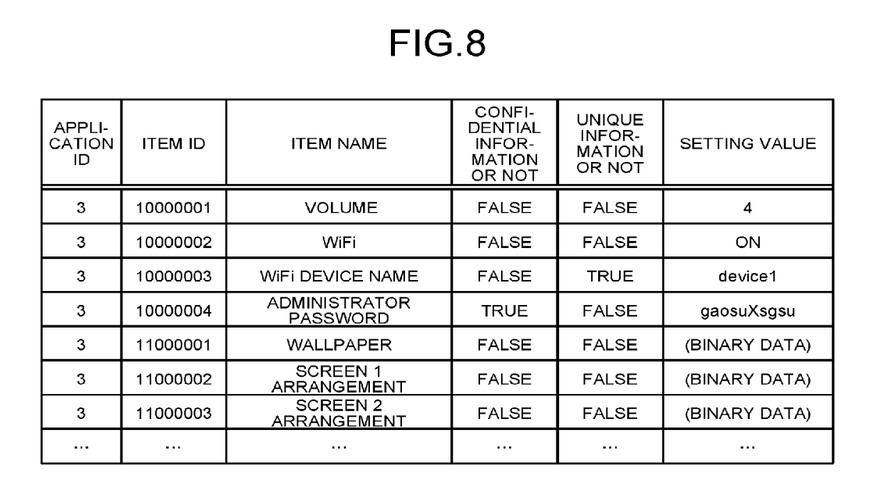
FIG. 8 is a diagram illustrating an example of setting information to be transmitted and received between a setting manager of an operation unit and a main body unit.

FIG. 8 illustrates an example of setting information to be transmitted and received between the first setting manager 126 of the operation unit 20 and the main body unit 10. FIG. 8 illustrates setting information in the case where the setting information in FIGS. 6 and 7 is connected. In this manner, the first setting manager 126 collectively notifies the second setting manager 116 of the main body unit 10 of the setting information generated by each of the applications of the operation unit 20.

Figure 9:
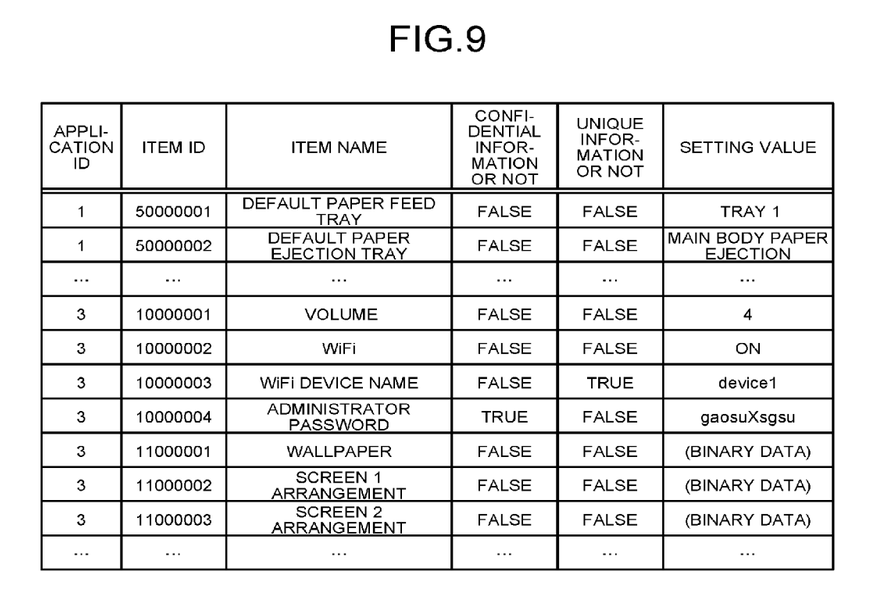
FIG. 9 is a diagram illustrating an example of setting information to be eventually generated by a setting manager of the body unit.

FIG. 9 illustrates an example of setting information to be eventually generated by the second setting manager 116 of the main body unit 10. The second setting manager 116 generates setting information in which setting information of the applications in the main body unit 10 is collected in addition to the setting information in FIG. 8 and outputs the generated setting information as ultimate setting information (export file and the like). For the setting information of the applications in the main body unit 10, FIG. 9 illustrates an example of setting information in which setting information corresponding to an "application ID=1" is added.

In an import processing, the setting information illustrated in FIG. 9 is input as setting information as an import target (import file and the like).

Figure 10:
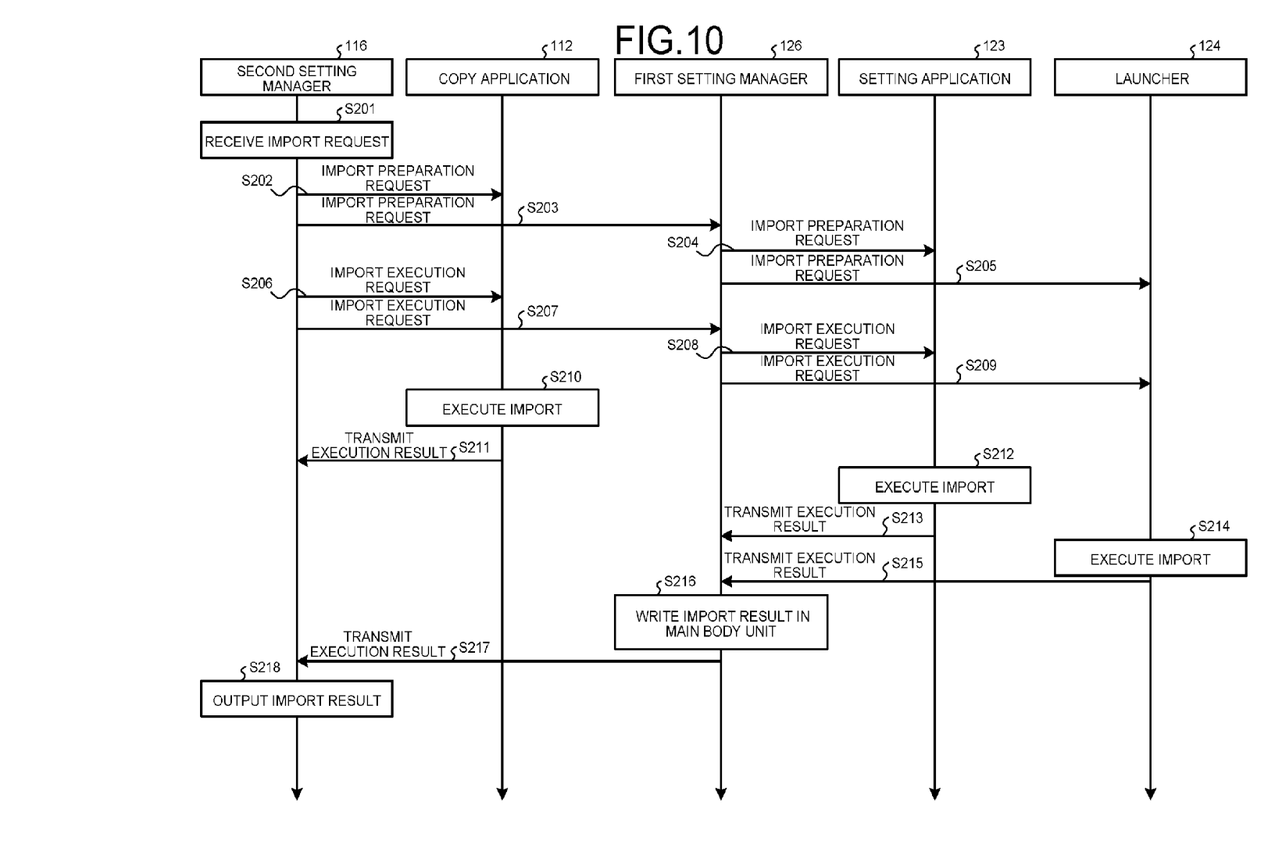
FIG. 10 is a sequence diagram of an example of an import processing according to the embodiment.

Next, an import processing by the MFP 1 according to the embodiment will be explained with reference to FIG. 10. FIG. 10 is a sequence diagram of an example of an import processing according to the embodiment.

The second setting manager 116 first receives an import request from a user and the like (step S201). The import request may include a designation of an application as an import target, a designation of setting information (import file and the like) to import, and the like.

The second setting manager 116 transmits an import preparation request (steps S202 and S203). The first setting manager 126 of the operation unit 20 transmits the import preparation request to the inside of the operation unit 20 when receiving the import preparation request from the second setting manager 116 (steps S204 and S205).

The import preparation request causes each application to execute a processing which becomes necessary before the import of the setting information. When such a processing is not necessary, the import preparation request may be configured not to be transmitted.

The import preparation request may be transmitted to the application as the import target or transmitted by broadcast and the like similarly to the export preparation request and the export execution request explained above. FIG. 10 illustrates an example in which the copy application 112 working in the main body unit 10, and the setting application 123 and the launcher 124 working in the operation unit 20 are treated each as the import target.

The second setting manager 116 of the main body unit 10 transmits an import execution request (steps S206 and S207). The first setting manager 126 of the operation unit 20 transmits the import execution request to the inside of the operation unit 20 when receiving the import execution request from the second setting manager 116 (steps S208 and S209). The import execution request may be transmitted to the application as the import target or by broadcast and the like similarly to the import preparation request.

Each application as the import target having received the import execution request executes an import for reading out and making a setting of its own setting information from a designated or a preset storage (the HDD 14, for example) (steps S210, S212, and S214).

When the import file is stored in the HDD 14 for example, each application is able to specify and read out, by using the application ID and the item ID, its own setting information in the setting information in the import file in the HDD 14.

The second setting manager 116 may divide (separate) the respective pieces of setting information included in the import file for respective applications and store the divided setting information in the storage and the like (the HDD 14, for example). The second setting manager 116 may divide only the setting information of the operation unit applications and store the divided setting information in the storage (the flash memory 24 and the like) in the operation unit 20. In this case, the operation unit application specifies and reads out its own setting information in the setting information stored in the flash memory 24, for example.

Each application transmits a result of the execution of the import to the origin of the transmission of the import execution request. For example, the copy application 112 transmits the execution result to the second setting manager 116 (step S211). For example, the setting application 123 and the launcher 124 transmit the execution result to the first setting manager 126 (steps S213 and S215).

When receiving the execution result from each of applications (the setting application 123 and the launcher 124 in the example of FIG. 10) within the operation unit 20, the first setting manager 126 of the operation unit 20 generates an execution result (import result) in which the execution results of the applications are collected. The first setting manager 126 writes the generated import result in the storage (the HDD 14, for example) of the main body unit 10 (step S216). The first setting manager 126 transmits the import result to the second setting manager 116 of the main body unit 10 (step S217). Here, the import result is information indicating whether or not the import processing ends in succeed, for example.

When receiving the execution results from all the applications each as the import target, the second setting manager 116 generates an import result in which the execution results of the applications are collected and outputs the generated import result to the origin of the import request (step S218).

Figure 11:
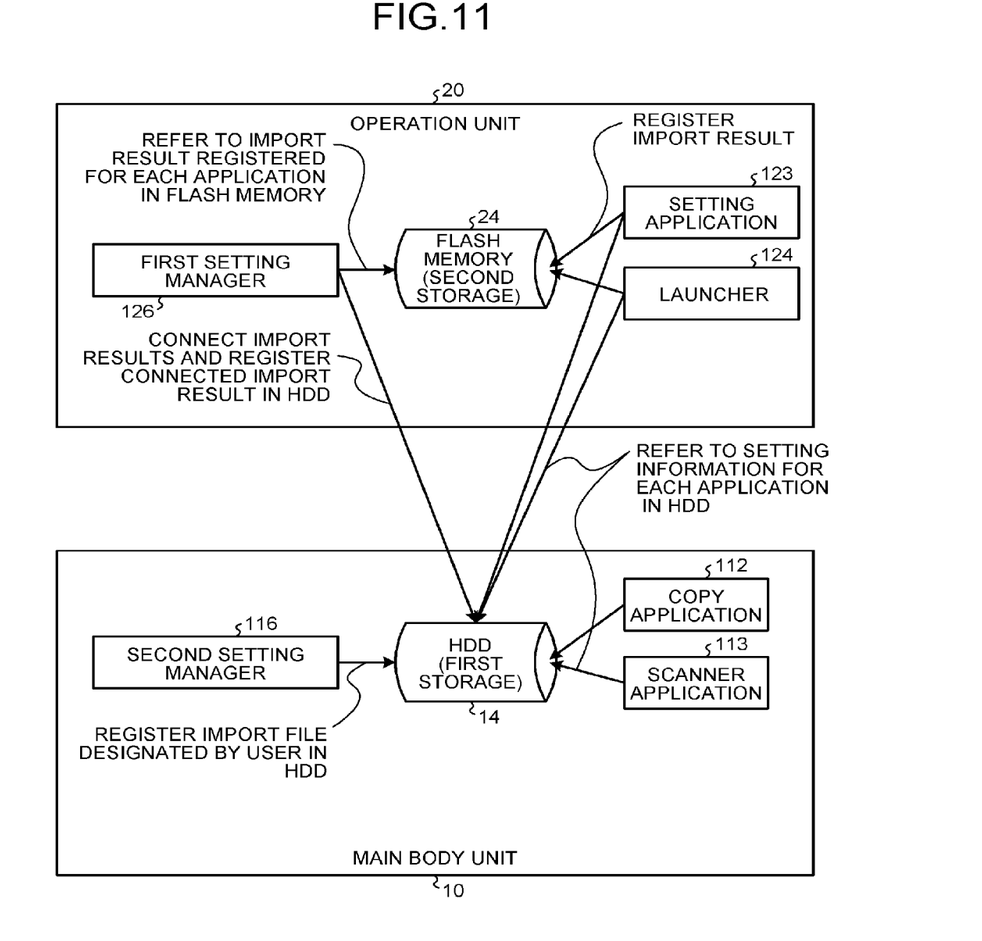
FIG. 11 is an explanatory view of a flow of each piece of information in the import processing.

FIG. 11 is an explanatory view of a flow of each piece of information in the import processing. FIG. 11 illustrates an example in which the copy application 112, the scanner application 113, the setting application 123, and the launcher 124 are treated each as the import target.

In the import processing, the second setting manager 116 registers a designated import file in the HDD 14. Each application executes the import processing with reference to the import file. Each of the operation unit applications stores each import result in the flash memory 24.

The first setting manager 126 of the operation unit 20 refers to the import result stored for each of the applications (the setting application 123 and the launcher 124 in the example of FIG. 5) in the operation unit 20, collects the import results, and stores the collected import result as a total import result of the operation unit 20 in the HDD 14 of the main body unit 10.

As explained so far, the MFP according to the embodiment is provided with the operation unit and the main body unit, and the setting manager provided in the operation unit and the setting manager provided in the main body unit execute the import processing and the export processing of setting information dispersedly. It is thereby possible to effectively manage setting information of each function.

A program to be executed in the device (image forming device) according to the embodiment is provided by being preloaded in a ROM and the like.

The program to be executed in the device according to the embodiment may be provided by being recorded in a file of an installable format or of an executable format in a computer-readable recording medium such as a CD-ROM, a flexible disk (FD), a CD-R, and a DVD (Digital Versatile Disk) as a computer program product.

The program to be executed in the device according to the embodiment may be stored on a computer connected to a network such as the Internet and provided by being downloaded via the network. Besides, the program to be executed in the device according to the embodiment may be provided or distributed via s network such as the Internet.

The program to be executed in the device according to the embodiment has a module configuration including the above-explained components and, as an actual hardware, a CPU (processor) reads out from the ROM and executes the program, so that each component is loaded and generated on a main storage device. Besides, a part or all of the functions of the above-explained components may be realized by a dedicated hardware circuit.

According to the embodiment, there is an advantage in that setting information can be managed effectively even with a configuration provided with a main body unit and an operation unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system, comprising:
an operation unit that receives an operational input; and
a main body unit that operates depending on the operational input,
wherein, the operation unit includes a first setting manager that transmits, to the main body unit, first setting information in which setting information of at least one operation unit application which is an application working in the operation unit is integrated, and
the main body unit includes a second setting manager that receives export request for exporting setting information from a user, transmits the received export request to the first setting manager that transmits an export preparation request to the operation unit, the second setting manager exports to an external device second setting information in which setting information of at least one main body unit application which is an application working in the main body unit and the first setting information is integrated, wherein the second setting manager further receives third setting information that is imported from another external device, wherein
the main body unit includes a first storage,
the second setting manager receives the third setting information including at least one of the setting information of the main body unit application and the setting information of the operation unit application, stores setting information included in the third setting information in the first storage, and requests the main body unit application and the first setting manager to import the setting information stored in the first storage,
the first setting manager further requests the operation unit application to import the setting information stored in the first storage when requested from the second setting manager to import the setting information,
the operation unit includes a second storage, and
the first setting manager reads out setting information stored for the operation unit application in the second storage and transmits the first setting information in which the read setting information is integrated to the main body unit.

2. The information processing system according to claim 1, wherein
the second setting manager reads out setting information stored for the main body unit application in the first storage and exports the second setting information in which the read setting information and the first setting information received from the operation unit is integrated.

3. An information processing method to be executed in an information processing system including an operation unit that receives an operational input and a main body unit that operates depending on the operational input, the information processing method comprising:
transmitting, to the main body unit, first setting information in which setting information of at least one operation unit application which is an application working in the operation unit is integrated;
receiving export request for exporting setting information from a user;
transmitting the received export request to a first setting manager;
transmitting, by the first setting manager, an export preparation request to the operation unit;
exporting to an external device second setting information in which setting information of at least one main body unit application which is an application working in the main body unit and the first setting information is integrated; and
receiving third setting information that is imported from another external device, wherein
the main body unit includes a first storage and a second setting manager,
the second setting manager receives the third setting information including at least one of the setting information of the main body unit application and the setting information of the operation unit application, stores setting information included in the third setting information in the first storage, and requests the main body unit application and the first setting manager to import the setting information stored in the first storage,
the first setting manager further requests the operation unit application to import the setting information stored in the first storage when requested from the second setting manager to import the setting information,
the operation unit includes a second storage, and
the first setting manager reads out setting information stored for the operation unit application in the second storage and transmits the first setting information in which the read setting information is integrated to the main body unit.

4. An information processing system, comprising:
an operation circuitry configured to receive an operational input from a user, based on the operational input, generate first setting information including setting information of at least a first application working in the operation circuitry, and transmit the first setting information to a main body circuitry; and the main body circuitry configured to receive the first setting information from the operation circuitry, generate second setting information by integrating setting information of at least a second application working in the main body circuitry and the first setting information, export the second setting information to an external device, and receive third setting information from another external device, wherein the main body circuitry includes a second setting manager that receives export request for exporting setting information from the user, transmits the received export request to a first setting manager that transmits an export preparation request to the operation circuitry, the second setting manager exporting the second setting information to the external device, the main body circuitry includes a first storage, the second setting manager receives the third setting information including at least one of the setting information of an application working in the main body circuitry and the setting information of an application working in the operation circuitry, stores setting information included in the third setting information in the first storage, and requests the application of the main body circuitry and the first setting manager to import the setting information stored in the first storage, the first setting manager further requests the application of the operation circuitry to import the setting information stored in the first storage when requested from the second setting manager to import the setting information, the operation circuitry includes a second storage, and the first setting manager reads out setting information stored for the application of the operation circuitry in the second storage and transmits the first setting information in which the read setting information is integrated to the main body circuitry.

* * * * *